C-R TUBE DEFLECTION CIRCUIT
Filed Aug. 27, 1956
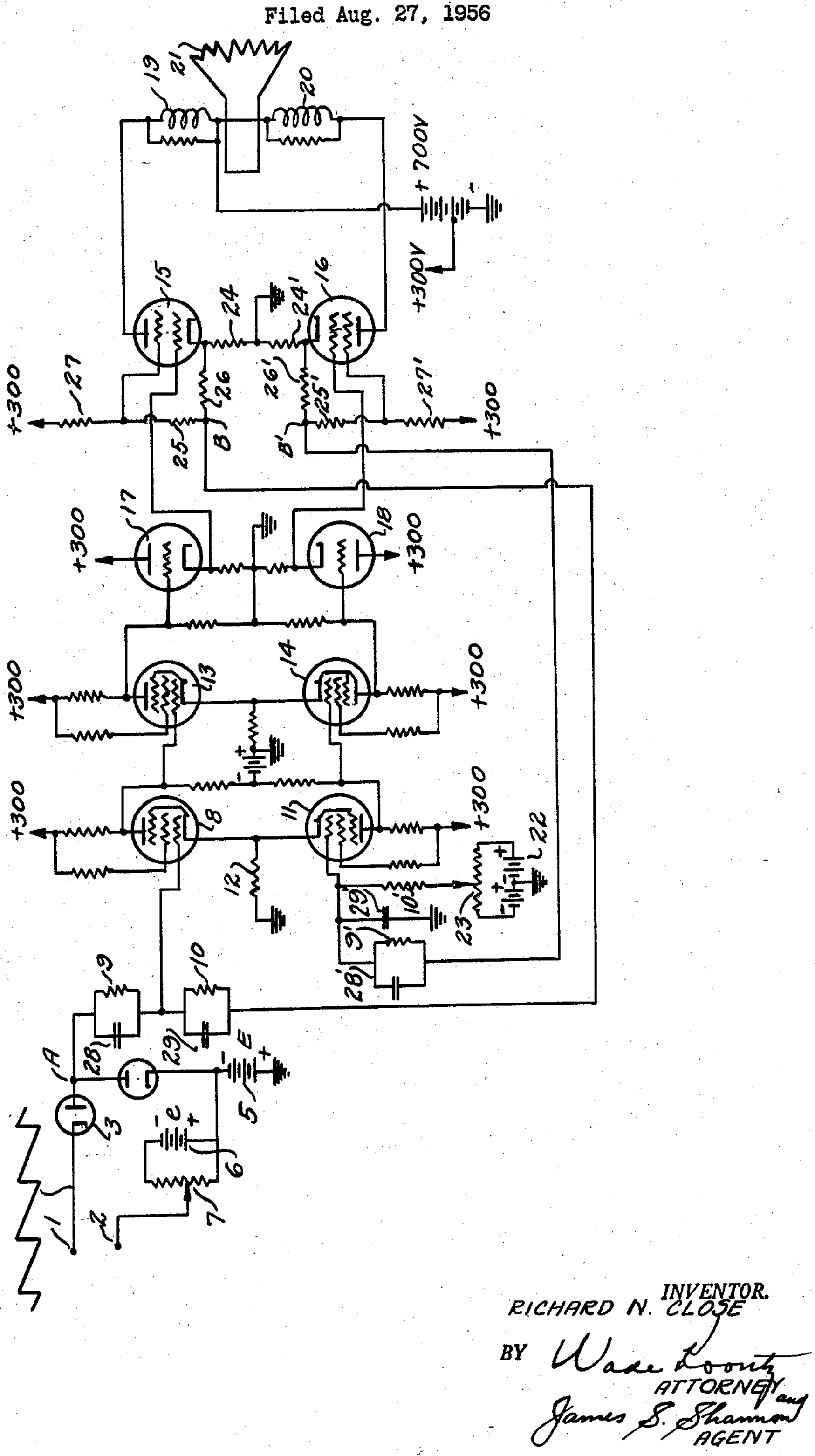
INVENTOR.
RICHARD N. CLOSE
BY Wade Koontz
ATTORNEY and
James S. Shannon
AGENT United States Patent Office 2,853,650

Patented Sept. 23, 1958

2,853,650

C.-R. TUBE DEFLECTION CIRCUIT

Richard N. Close, Garden City, N. Y., assignor to the United States of America as represented by the Secretary of the Air Force Application August 27, 1956, Serial No. 606,530

4 Claims. (Cl. 315—27)

This invention relates to magnetic deflection systems for cathode ray tubes and particularly to the amplifiers used in such systems. It is the object of the invention to provide a deflection amplifier in which means are provided for maintaining a high degree of linearity between the sweep voltage input of the amplifier and the amplifier output current flowing through the magnetic deflection yoke of the cathode ray tube.

It is known in deflection amplifiers to utilize negative feedback obtained from the cathode of the output stage in an effort to obtain linearity between the input sweep voltage and the deflection current. However, in cases where the output stage is a pentode, tetrode or beam power tube having a screen grid, the cathode current contains the screen current in addition to the anode current. Since the feedback voltage should be proportional to the anode current, which is the current flowing through the deflection yoke, alone the presence of the screen current at the cathode limits the degree of linearity that can be attained. In accordance with this invention the feedback voltage is obtained from a network interconnecting the screen grid and the cathode and so designed that the feedback voltage supplied by the network is independent of screen grid current. The invention, employed in push-pull feedback circuits, is particularly applicable to push-pull deflection amplifiers in which Class AB operation of the output stage is employed.

A more detailed description of the invention will be given in connection with the specific embodiment thereof shown in the accompanying drawing in which the single figure is a schematic diagram of a direct coupled push-pull deflection amplifier incorporating the invention.

Referring to the drawing the deflection amplifier shown may, for example, be the single deflection amplifier in a PPI (plan position indication) display of the type in which the deflection yoke revolves or may be one of the two deflection amplifiers employed in a PPI display of the type in which two stationary deflection yokes at right angles to each other are provided to produce simultaneous $x$-axis and $y$-axis deflections of beam. In any case a sweep input voltage is applied between input terminals 1 and 2. This may be a saw-tooth voltage as shown in the drawing and, in the embodiment described, is a negative-going voltage, i. e., in the presence of an input voltage, the voltage of terminal 2 is always below that of terminal 1. From the input terminals the sweep voltage wave is applied to a network that places certain polarity and amplitude restrictions on the signal applied to the amplifier. The diode 3 prevents the application of a positive signal to the amplifier since it prevents the flow of current from terminal 1 toward the amplifier. Diode 4 together with voltage source 5 act to clamp point A to $-E$ volts so that the potential of this point can not rise above the clamp voltage. Voltage source 6 supplies an adjustable offset voltage the purpose of which will be explained later. The sweep voltage at terminal 1 therefore always starts at a potential relative to ground of $-(E+kc.)$ where $k$ varies from 0 to 1 depending upon the setting of potentiometer 7.

A portion of the sweep voltage at point A is applied to the grid of amplifier tube 8 through a potential dividing network consisting of resistors 9, 10 and the resistance between point B and ground. Resistors 9 and 10 may be equal and each large relative to the resistance from point B to ground so that substantially one-half of the voltage at point A is applied to the grid.

Tube 11 acts as a phase inverter because of the presence of resistor 12 common to the cathodes of tubes 8 and 11. This resistor provides a coupling between the output circuit of tube 8 and the input of tube 11 and serves to apply an input signal to this tube that is in phase opposition to that applied to tube 8. As a result the anode current of tube 11 is in phase opposition to the anode current of tube 8 and therefore only the difference in the two currents flows in resistor 12. Because of the high amplification of tube 11 a very small difference in the two anode currents is sufficient to supply the excitation of this tube and therefore the signals on the anodes of tubes 8 and 11 are opposite in phase and substantially equal. These signals are amplified in a conventional direct coupled push-pull amplifier stage comprising tubes 13 and 14. The output of this stage is applied to the control grids of the power tetrodes 15 and 16 by way of cathode follower stages 17 and 18 which serve as low impedance driving sources for the push-pull power amplifier stage. The deflection coils 19 and 20 of cathode ray tube 21 are connected in push-pull fashion to the anode circuits of power amplifiers 15 and 16.

The described amplifier being direct coupled can handle direct current, and therefore it is possible to control the centering and offset of the sweep by the insertion of direct voltages at appropriate points. Voltage source 22 and potentiometer 23 serve to insert an adjustable direct voltage of either polarity into the input circuit of tube 11 for centering the sweep. The offset of the sweep, or the point at which it starts relative to the center point established above, is controlled by potentiometer 7 through which an adjustable direct voltage is inserted in series with the input sweep signal.

In order to have the sweep of the cathode ray tube beam linearly follow the sweep voltage applied to terminals 1—2 it is necessary that a linear relationship exist between the current in coils 19—20 and the sweep voltage at these terminals. For the purpose of effecting this linearity a push-pull negative feedback circuit is provided between output tubes 15—16 and tubes 8—9. In accordance with the invention, the feedback voltage from tube 15 to tube 8 is obtained at point B and, similarly, the feedback voltage from tube 16 to tube 11 is obtained at point B′. The purpose of obtaining the voltages from these points is to provide feedback voltages that are proportional to the anode currents and independent of the screen grid currents in the two output tubes. That this is true may be seen from an analysis of the operation of one of the output tubes and associated circuit in the presence of a change in control grid potential. Assume, for example, that the control grid potential of tube 15 increases. This results in an increase in the anode and screen currents flowing in resistor 24 and a corresponding increase in cathode potential. The potential of point B is dependent upon both screen and cathode potentials since it is connected to both through resistors 25 and 26. An increase in screen current causes the potential of the screen to decrease due to the increased current flow in resistor 27 and tends to lower the potential of point B. An increase in screen current causes the cathode potential to increase due to the increased current flow in resistor 24 and tends to raise the potential of point B. By properly proportioning resistors 25 and 26 the drop in potential of point B due to the decrease in screen potential can be made to cancel the rise in potential of point B due to the increase in cathode potential so that the potential of this point is independent of the screen current. The feedback voltage obtained at point B is therefore proportional to the anode current of tube 15 which is also the current flowing in coil 19. Similarly the feedback potential at point B' is proportional to the current in coil 20 and independent of the tube 16 screen current. In order that the feedback to tube 11 be the same as that to tube 8 resistors 9' and 10' have the same values as resistors 9 and 10, and condensers 28' and 29' have the same values as condensers 28 and 29.

Class AB operation of the power tubes 15 and 16 in the described circuit is permissible since the total feedback voltage, i. e. the voltage between terminals B and B', is proportional to the total flux produced by the anode currents of tubes 15 and 16 flowing in deflection coils 19 and 20.

I claim:

1. An amplifier having: an input circuit; a final stage comprising an amplifier tube having an anode, a cathode, a screen grid and a control grid; means for coupling said input circuit to said control grid; a load circuit; a source of direct current; means connecting said anode through said load circuit to the positive terminal of said source; means connecting said screen grid through a resistor to the positive terminal of said source; a cathode resistor connected between said cathode and the negative terminal of said source; a pair of resistors connected in series between said screen grid and said cathode, the relative values of said resistors being such that the voltage between their junction and the negative terminal of said source is independent of that part of the current in said cathode resistor attributable to the screen grid; and means applying said voltage to said input circuit as a feedback voltage.

2. An amplifier having: a push-pull input circuit; a final stage comprising a pair of like amplifier tubes each having an anode, a cathode, a screen grid and a control gird; means for coupling said input circuit to said control grids in push-pull fashion; a load circuit; a source of direct current; means coupling said load circuit to the anodes of said tubes and to the positive terminal of said source in push-pull fashion; means connecting said screen grids through individual resistors to the positive terminal of said source; an individual cathode resistor connected between the cathode of each tube and the negative terminal of said source; a pair of resistors connected in series between the screen grid and cathode of one of said tubes and a similar pair of resistors connected in series between the screen grid and cathode of the other tube; the relative values of the resistors in each pair being such that the voltage between their junction and the negative terminal of said source is independent of that part of the current in the cathode resistor of the associated tube attributable to the screen grid; and means for applying the voltage at one of said junctions to one side of said push-pull input circuit as a feedback voltage and for applying the voltage at the other of said junctions to the other side of said input circuit as a feedback voltage.

3. Apparatus as claimed in claim 2 in which said load circuit is the magnetic deflection coil of a cathode-ray tube, said coil having its center point connected to the positive terminal of said source and its ends connected to the anodes of said amplifier tubes.

4. Apparatus as claimed in claim 2 in which said amplifier tubes are biased for Class AB operation.

No references cited.